United States Patent

Mott et al.

[11] Patent Number: 5,980,406
[45] Date of Patent: Nov. 9, 1999

[54] SPROCKET ASSEMBLY FOR A PHASED CHAIN SYSTEM

[75] Inventors: Philip J. Mott; David C. White, both of Dryden; Timothy J. Ledvina, Groton; Thomas J. Becker, Auburn; Roger G. Young, Jr., Lansing, all of N.Y.

[73] Assignee: Borg-Warner Automotive, Inc., Troy, Mich.

[21] Appl. No.: 08/696,531

[22] Filed: Aug. 14, 1996

[51] Int. Cl.⁶ .............................. F16H 55/30; F16H 7/00
[52] U.S. Cl. .............................. 474/84; 474/152; 474/903
[58] Field of Search .............................. 474/84, 902, 900, 474/4, 73, 152, 158, 903, 148; 403/359

[56] References Cited

U.S. PATENT DOCUMENTS

| | | |
|---|---|---|
| 1,201,748 | 10/1916 | Luce . |
| 1,835,406 | 12/1931 | Kirsten . |
| 1,841,925 | 1/1932 | Woodbury .............................. 474/164 |
| 2,730,387 | 1/1956 | White .............................. 403/359 |
| 3,029,654 | 4/1962 | Hill . |
| 3,222,772 | 12/1965 | Leyner .............................. 403/359 |
| 3,377,875 | 4/1968 | Sand . |
| 3,495,468 | 2/1970 | Griffel . |
| 4,603,597 | 8/1986 | Onorati .............................. 74/434 |
| 4,832,668 | 5/1989 | Ledvina et al. . |
| 5,170,883 | 12/1992 | Ledet et al. . |
| 5,267,910 | 12/1993 | Maruyama et al. .............................. 474/212 |
| 5,305,704 | 4/1994 | Olaniyan .............................. 116/28 R |
| 5,427,580 | 6/1995 | Ledvina et al. . |
| 5,437,581 | 8/1995 | Ledvina et al. . |
| 5,453,059 | 9/1995 | Avramidis et al. .............................. 474/212 |
| 5,588,926 | 12/1996 | Mott et al. .............................. 474/212 |
| 5,690,568 | 11/1997 | Watson .............................. 474/85 |
| 5,690,571 | 11/1997 | Mott .............................. 474/212 |

FOREIGN PATENT DOCUMENTS

| | | |
|---|---|---|
| 19654570 | 8/1997 | Germany . |
| 56-4780 | 1/1981 | Japan . |
| 62-251564 | 11/1987 | Japan .............................. 474/156 |
| 5-17251 | 3/1993 | Japan . |
| 962154 | 7/1964 | United Kingdom . |
| 1051781 | 12/1966 | United Kingdom . |

OTHER PUBLICATIONS

International Application—WO 87/06863—Nov. 19, 1987.
European Search Report—EP 97 30 5698—Jan. 30, 1998.

*Primary Examiner*—Thomas B. Will
*Assistant Examiner*—Gary S. Hartmann
*Attorney, Agent, or Firm*—Sidley & Austin; Greg Dziegielewski

[57] ABSTRACT

A chain and sprocket system includes a plurality of chains and sprockets. The system includes a central shaft, two chains, and two identical sprockets. Although the two sprockets have identical size, shape, and features, they can be assembled onto the central shaft in different orientations. These orientations are achieved by rotating one sprocket with respect to the other. Assembling one sprocket onto the shaft in a different orientation from a second sprocket results in a system where the outer sprocket teeth of one sprocket are phased with respect to the outer sprocket teeth of the other sprocket. In this way, a phased chain and sprocket assembly is composed of identical sprockets, which eases manufacture and assembly.

11 Claims, 8 Drawing Sheets

SPROCKET ASSEMBLY FOR A PHASED CHAIN SYSTEM

Reference is made to pending application Ser. No. 08/595,038, filed Jan. 31, 1996, entitled "Idler Sprocket Assembly For a Phased Chain System," the subject matter of which relates to the present invention.

BACKGROUND OF THE INVENTION

The present invention relates generally to power transmission chains, and more particularly, to a power transmission chain system in which the chains are phased or offset by a portion of a pitch length or a portion of a sprocket tooth. The phasing of the chain and sprocket system modifies the noise characteristics of the system.

Power transmission chains are widely used in the automotive industry in automobile transmission systems as well as in engine timing drives. Engine timing systems conventionally include at least one driving sprocket located on the crankshaft and at least one driven sprocket located on a camshaft. Rotation of the crankshaft causes rotation of the camshaft through a chain and sprocket system. In automotive transmission systems, power transmission chains are used, for example, between a torque converter and the input to an automatic transmission. Power transmission chains are also used in transfer cases for four-wheel drive vehicles.

Noise is associated with chain drives. Noise is generated by a variety of sources, including the impact sound generated by the collision of the chain and the sprocket at the onset of meshing, and the chordal action of the chains and sprockets.

As to the impact sound generated, loudness is affected by, among other things, the impact velocity between the chain and the sprocket, and the mass of chain links contacting the sprocket at a particular moment or time increment. The meshing impact sound is generally a periodic sound in chain drives because the impact sound is repeated with a frequency generally equal to that of the frequency of the chain meshing with the sprocket. The frequency is related to the number of teeth on the sprocket and the speed of the sprocket. The impact can therefore produce sound having objectionable pure sonic tones.

Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative thereof.

Many efforts have been made to decrease the noise level and pitch frequency distribution in chain drives so as to minimize the objectionable effects of the pure sonic tones. For example, U.S. Pat. No. 5,427,580, which is incorporated herein by reference, discloses the phasing of sprockets so as to modify the impact generated noise spectrum as well as the chordal action noise spectrum. The present invention utilizes the concepts taught in U.S. Pat. No. 5,427,580, in a sprocket system.

The phased chain system of the present invention includes phasing of two sprockets with respect to one another along a driving or driven shaft. Phasing of sprockets can reduce the number of chain link teeth (or mass of chain) impacting the sprockets along the shaft during a given time increment. Similarly, phasing the sprockets can alter or phase the chordal action or articulation of the chains and sprockets, and the resulting impact and chordal action generated noise.

Prior art chain drives have provided for the phasing of sprockets. However, in these chain drives, the two sprockets are machined on a single hub along the shaft. Such a system requires a complicated manufacturing process to machine two sprockets on a single hub.

Other prior art phased systems have used a pair of sprockets that are bolted together or riveted together to maintain the sprockets in the phased or offset positions. Such a system requires the manufacturing step of placement of the two sprockets in the offset position and then riveting or bolting in position.

In contrast, in its preferred embodiment, the present invention utilizes an sprocket assembly formed of separate, but identical pieces. Each of the sprockets have projections or grooves, such as splines or keyways, which are fitted to corresponding splines or keyways on a central shaft. Each sprocket can be assembled on the central shaft in at least two orientations, where each orientation results in a different alignment of the outer sprocket teeth. By positioning of one sprocket in one orientation, and other sprockets in other orientations, the phased or offset relationship can be attained. The sprocket assembly of the present invention provides advantages in the manufacture of sprockets and assembly.

SUMMARY OF THE INVENTION

The present invention relates to phased chain assemblies or systems and in particular, to a phased sprocket assembly formed of a plurality of sprockets placed on a shaft or hub.

The present invention is directed to providing a phased relationship between a pair of sprockets in a chain system. Phasing is provided to modify the impact generated noise spectrum as well as the chordal action generated noise spectrum. Phasing can be accomplished by phasing or offsetting the sprockets by one-half tooth (one-half pitch) or by one-quarter tooth (one-quarter pitch), or any other desired amount of phasing.

In the present invention, two sprockets are placed in side-by-side, but offset or phased relation on a driving shaft or driven shaft of a chain and sprocket assembly. The assembly may be a drive between a power input and power output of a transfer case or from a torque converter to an automatic transmission. The drive may also be between a crankshaft and camshaft of an engine timing drive or between camshafts of a camshaft-to-camshaft drive in a timing system.

The two sprockets each have a number of projections and grooves on the inner circumferential surface. For some embodiments, these projections and grooves are splines, and for others they are keyways.

For some embodiments, the sprocket has internal splines that can be assembled onto a splined hub or shaft. The internal splines of each of the sprockets are preferably identical. The first two embodiments involve sprockets with these internal splines.

For purposes of this application, "axial alignment" will be defined as alignment along an axis parallel to the axis of the central shaft; typically, it will refer to whether the features of one sprocket are adjacent to or offset to the features of another sprocket when the two sprockets are assembled on the central shaft. For purposes of this application, "radial alignment" will be defined as alignment along a radius on the face of a sprocket; typically it will refer to whether an internal spline on the inner circumferential surface of the sprocket is aligned with an outer sprocket tooth on the outer circumferential surface of the sprocket.

For purposes of this application, "rotation" of one sprocket with respect to another will be defined as rotating one sprocket from a first position of circumferential alignment of both outer sprocket teeth and inner spline or keyway of both sprockets to a second position where the internal splines or keyways of the two sprockets are axially aligned, but the outer sprocket teeth are axially offset, before placement on the shaft in an assembled position. In addition, for purposes of this application, circumferential "offset" of one sprocket with respect to another will be defined as the fractional part of a sprocket tooth that one sprocket is circumferentially offset or positioned with respect to a sprocket tooth on the adjacent sprocket after assembly on the spline.

For purposes of this application, the "center of the sprocket" will refer to a point on the sprocket face that lies on the axis of the central shaft.

In one embodiment, one sprocket is rotated 90 degrees about the axis of the central shaft with respect to a second sprocket. This rotation aligns a internal spline tooth with an outer sprocket tooth of one sprocket and the same internal spline tooth with an outer sprocket root (the location between adjacent sprocket teeth) on the second sprocket. Accordingly, phased or circumferentially offset relationship is achieved.

In another embodiment, the internal splines are symmetric about a given axis running through the center of the sprocket on the plane of the face of the sprocket. The outer teeth are symmetric about another axis, which also runs through the center of the sprocket on the plane of the face of the sprocket, but which is offset from the internal spline axis by a given angular distance.

The second sprocket is rotated about the internal spline axis of symmetry, so that the front face of the first sprocket is adjacent to the front face of the second sprocket. Because the internal splines are symmetric, the internal splines between the first sprocket and the rotated second sprocket are axially aligned. But because the outer sprocket teeth are not symmetric about the axis of rotation, the outer sprocket teeth of the first sprocket are circumferentially offset with respect to the outer sprocket teeth of the second sprocket. The offset is twice the angular distance between the outer sprocket teeth axis of symmetry and the internal spline axis of symmetry. In this way, both sprockets have internal splines aligned, but their outer sprocket teeth are phased by a given offset.

In another embodiment using this symmetry mechanism, two splines, spaced 180 degrees apart, are removed from each sprocket to restrict the assembler to the proper axis for rotation. In another embodiment, the sprockets are secured to the shaft or hub by snap rings or the like.

In another embodiment, the inner circumferential surface does not contain splines. Instead, two keyways are cut into the inner circumferential surface. These keyways are identical in shape and size. One sprocket is then rotated and the two sprockets are assembled front to front with the keyways aligned axially. However, the geometry of the outer sprocket teeth and the keyways is such that after rotation, the outer sprocket teeth are phased with respect to the outer sprocket teeth of the sprocket before rotation. Therefore, when the two sprockets are assembled with keyways reversed, the outer sprocket teeth are phased.

In another embodiment, two keyways are spaced 180 degrees apart on the sprocket inner circumferential surface. There are an odd number of outer sprocket teeth, so that one keyway is aligned radially with an outer sprocket tooth root and the other keyway with an outer sprocket tooth tip. The second sprocket is rotated 180 degrees about the axis of the central shaft. The keyways are aligned axially, but the outer sprocket teeth are offset.

During assembly of the sprocket system, the splines or keyways are positioned along the shaft. First, one sprocket is positioned with splines or keyways aligned with the corresponding splines or keyways on the central shaft. Then, the second sprocket is positioned on the shaft. As with the first sprocket, the second sprocket splines or keyways are aligned with those of the central shaft. However, the second sprocket is rotated so that it is oriented differently from the first sprocket. The second sprocket's internal splines or keyways are aligned with those of the first sprocket and central shaft, but its outer teeth are circumferentially offset or phased with respect to the first sprocket.

Another embodiment involves identical sprockets having splines on the face of the sprocket, rather than on the inner circumferential surface of the sprocket. Two sprockets are assembled onto a central shaft with splines facing each other. One sprocket is rotated with respect to the other so that the splines interlock. Due to the geometry of the sprocket, this rotation causes phasing of the outer sprocket teeth. The phased sprockets are not rigidly connected to the central shaft, and may be free to spin in some circumstances. A clutch pack or dogleg on the side of the sprockets transmits torque.

DETAILED DESCRIPTION OF THE PREFERRED EMBODIMENTS

Turning now to the drawings, in one embodiment, in one embodiment, the present invention is directed to providing phased chain and sprocket systems using identical sprockets. This phasing modifies and reduces the general noise spectrum as well as the component of noise generated by chordal action in the system. The use of identical sprockets allows for ease of manufacture and assembly of the sprockets.

Figures 1, 2, 3, 4:
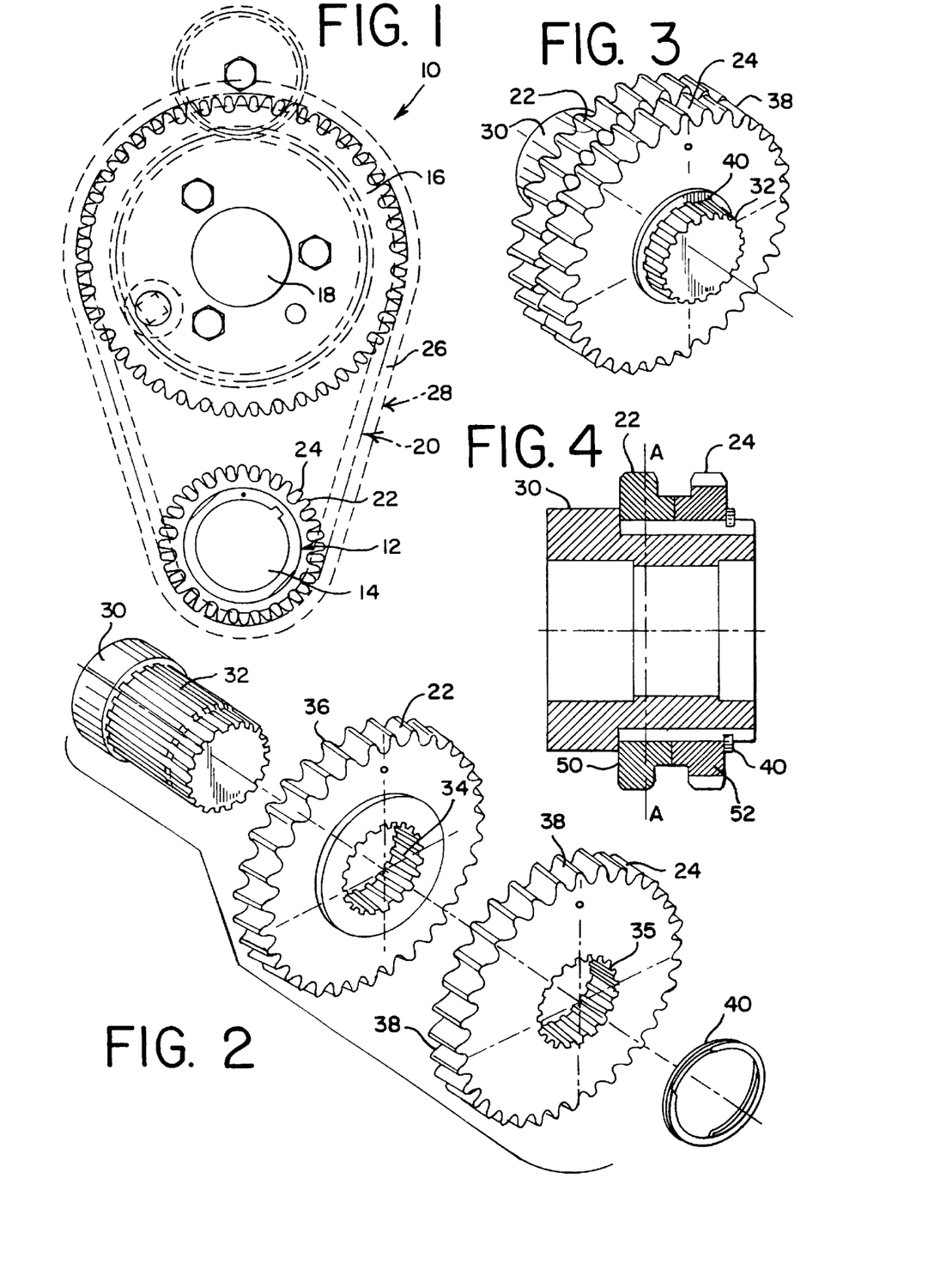
FIG. 1 is a schematic illustrating a chain system with a driving shaft and a driven shaft.
FIG. 2 is an exploded, perspective view of the present invention illustrating the components of the sprocket assembly.
FIG. 3 is a perspective view of the present invention illustrating the assembled components.
FIG. 4 is a sectional side view of the present invention.

FIG. 1 illustrates a portion of one embodiment of the chain and sprocket assembly. The power transfer system 10 includes a pair of driving sprockets at 12 located on the driving shaft 14 and a pair of driven sprockets at 16 located on the driven shaft 18. Rotation of the driving shaft 14 causes rotation of the driven shaft 18 through the chain and sprocket system 10.

In the phased system of the present invention, the driving shaft 14 and driven shaft 18 each house two sprockets, 22, 24 which are offset by one half pitch. Two side by side chains 26, 28 are placed on the sprockets.

FIG. 2 is an exploded, perspective view of the sprockets and central shaft 30. In this embodiment, the central shaft has splines 32 which interlock with internal splines 34 on the sprockets. Each sprocket also has outer teeth 36, 38, which connect with the chain 26, 28.

In assembly, a first sprocket 22 is positioned on the central shaft 30, with splines 32, 34 interlocking. A second sprocket 24 is then positioned on the central shaft adjacent to the first sprocket. The internal splines 35 of the second sprocket are interlocked with the splines 32 of the central shaft. However, the second sprocket is aligned such that the outer teeth 38 of the second sprocket are offset by a set distance, such as one half tooth, from the outer teeth 36 of the first sprocket 22. A means such as a snap ring 40 may be used to hold the sprockets axially on the central shaft.

FIG. 3 shows the assembled system, with outer teeth phased at one half tooth. FIG. 4 is a side sectional view of the assembled system.

The first embodiment involves sprockets whose geometry dictates that one sprocket can be a set number of teeth out of phase with an identical sprocket rotated a set circumferential distance about the axis of the central shaft. For instance, FIG. 5 shows a sprocket which can be assembled adjacent to an identical sprocket one half tooth out of phase by rotating the second sprocket 90 degrees.

Figure 5A:
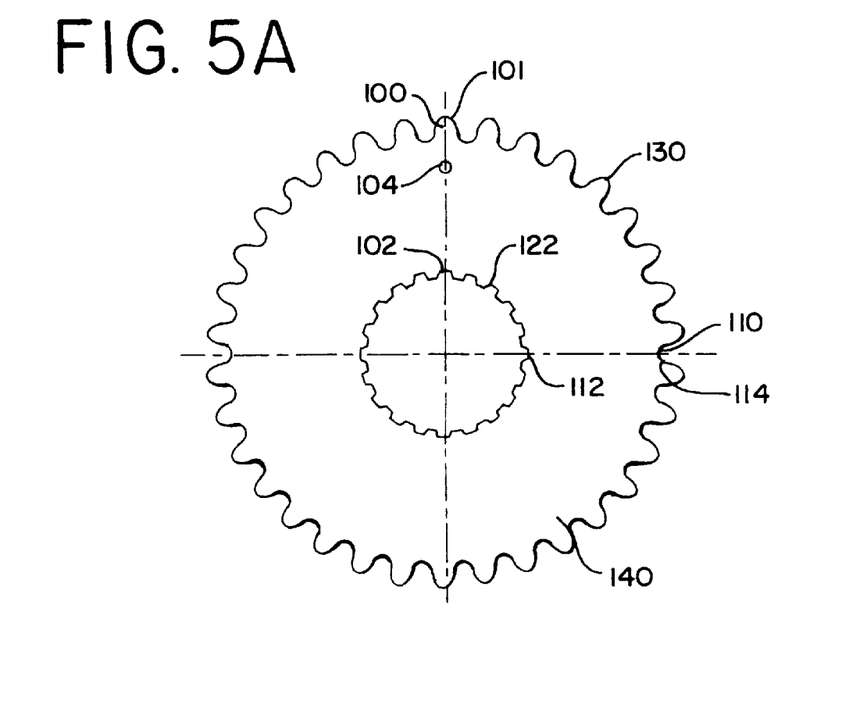
FIG. 5 is a side view of one embodiment of the present invention, with the sprockets phased at one-half tooth, having internal splines including one spline aligned with the root of an outer tooth and another spline spaced 90 degrees away aligned with the tip of an outer tooth.

In FIG. 5a, an internal spline 102 is aligned with the tip 101 of an outer sprocket tooth 100. This outer sprocket tooth is marked for reference by a hole 104 through the sprocket 140. Another internal spline 112 is located 90 degrees away from the first internal spline 102. This second internal spline 112 is radially aligned with the root 114 of another outer sprocket tooth 110.

Figure 5B:
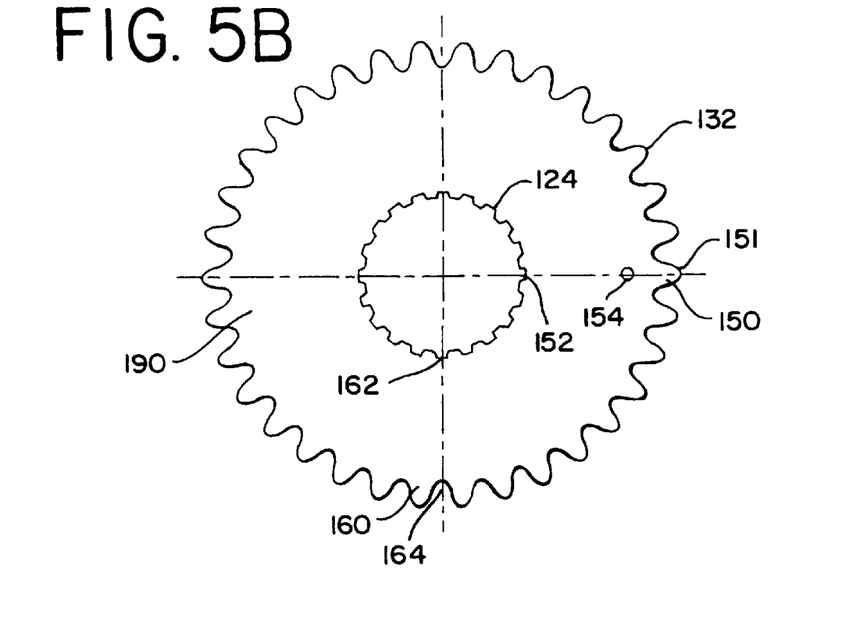

FIG. 5b shows the sprocket shown in FIG. 5a, oriented as it would be for assembly as the second sprocket in a phased chain system. The internal splines 124 of the FIG. 5b sprocket are axially aligned with the internal splines 122 of the FIG. 5a sprocket. However, the outer sprocket teeth 132 of the FIG. 5b sprocket are one half tooth offset to the outer sprocket teeth 130 of the FIG. 5a sprocket.

In particular, consider the angular position of internal spline 112 of FIG. 5a and internal spline 152 of FIG. 5b. Axially, internal spline 112 and internal spline 152 are aligned, so that the sprocket 140 of FIG. 5a can be assembled onto the same central shaft as the sprocket 190 of FIG. 5b. However, internal spline 112 of FIG. 5a is radially aligned with the root 114 of an outer sprocket tooth 110, while internal spline 152 of FIG. 5b is radially aligned with the tip 151 of an outer sprocket tooth 150.

The rotation phasing of FIGS. 5a and 5b is only possible with certain geometries involving the number of internal splines and outer sprocket teeth for each sprocket. For instance, the sprocket shown in FIGS. 5a and 5b has 34 teeth and 20 internal splines. As described above, that sprocket could be rotated 90 degrees to form a two sprocket assembly with one half tooth phasing.

The combination of 90 degree rotation and one half tooth offset is only possible for a sprocket having a number of internal splines that is a multiple of 4 and a number of outer teeth that is two more than a multiple of four. Mathematically, this requirement can be expressed as number of outer teeth=$4x+2$ number of internal splines=$4y$ where x and y can be any positive whole numbers. For the sprocket shown in FIG. 5, $x=8$ $y=5$.

Hence, $4x+2=34$ spline teeth $4y=20$ internal teeth.

Again, any x and any y can be used to form a system with one half degree phasing and 90 rotation. Note that x equals the number of whole outer sprocket teeth on the segment of the sprocket within the rotation angle, and y equals the number of internal splines on the segment of the sprocket within the rotation angle.

The algebraic formulae $4x+2$ and $4y$ are governed by the desired offset and angle of rotation. In order for the internal splines to be aligned after the second sprocket has been rotated 90 degrees, there must be a whole number of internal splines (e.g. 8 splines rather than 7½ splines) in any 90 degree section of the sprocket. In other words, the tip of any internal spline 102 must be exactly 90 degrees away from the tip of another internal spline 112. Otherwise, if for instance, the center of spline 102 is aligned with the edge or the root of spline 112, then after 90 degree rotation, the internal splines of the second sprocket would not be axially aligned with the internal splines of the first sprocket and the two sprockets could not be assembled onto a single central shaft.

Thus, in order for the tip of internal spline 102 to be aligned with the tip of internal spline 112, the number of internal splines must be a multiple of four. Referring to FIG. 5, each 90 section, or quadrant, of the sprocket must have an internal spline structure identical to the spline structure of the other 3 quadrants. Hence, the total number of internal splines must be the number of splines in a single quadrant, multiplied by four.

The formula 4x+2 for the number of outer teeth is governed by the desired offset. In FIG. 5, the desired offset is one half tooth. Therefore, the root of any one outer sprocket tooth 114 on a first sprocket 140 must be axially aligned with the tip 151 of an outer sprocket tooth 150 of a second sprocket 190. To achieve this alignment in a system of identical sprockets, the tip 101 of one outer sprocket tooth 100 must be radially 90 degrees away from the root 114 of another outer sprocket tooth 110. Any 90 degree quadrant of the sprocket must begin with a outer sprocket tooth tip and end with an outer sprocket tooth root. Therefore, the number of outer sprocket teeth in any 90 degree quadrant must be a whole number plus one half tooth. Therefore, the number of teeth for the entire sprocket must be four times some whole number plus four times one half, or a multiple of four plus 2. Hence the number of teeth must conform to the formula 4x+2.

Similar reasoning governs the formula for the number of teeth and internal splines for other offset distances and rotation angles. In general, the formula is $$\frac{\text{number of outer sprocket teeth}} = \frac{360 \text{ degrees}}{\text{rotation angle}} * (x + \text{number of teeth offset});$$

$$\frac{\text{number of internal splines}} = \frac{360 \text{ degrees}}{\text{rotation angle}} * y$$

For instance, for FIG. 5, 90 degree rotation angle and one half tooth offset requires 360/90*(x+½)=4x+2 outer teeth and (360/90)*y=4y internal splines. Hence, the number of outer sprocket teeth must be 2 more than a multiple of 4 and the number of internal splines must be a multiple of four.

Similarly, if a 60 degree rotation angle were desired, for half tooth offset, the number of teeth would be 360/60*(x+½)=6x+3 and the number of internal splines would be (360/60)*y=6y. The number of outer sprocket teeth would have to be three more than a multiple of 6, and the number of internal splines would have to be a multiple of 6. If a 180 degree rotation were desired with half tooth offset, the number of teeth would be 360/180*(x+½)=2x+1 and the number of internal splines would be (360/180)*y=2y. For 90 degree rotation and one quarter tooth offset, the number of outer teeth would be 360/90*(x+¼)=4x+1, and the number of internal splines would be (360/90)*y=4y. For 10 degree rotation and one quarter tooth offset, the number of teeth would be 360/10*(x+¼)=36x+9 and the number of internal splines would be (360/10)*y=36y.

The advantages of this embodiment include the ease of manufacturing and assembly resulting from constructing a phased chain and sprocket system out of identical sprockets. In addition, this embodiments provides that the sprockets are assembled front to back, rather than front to front or back to back. Referring to FIG. 4, front to back assembly allows sprockets asymmetric about a plane AA parallel to and midway between the faces 50, 52 of the sprocket.

Figures 6, 7, 8:
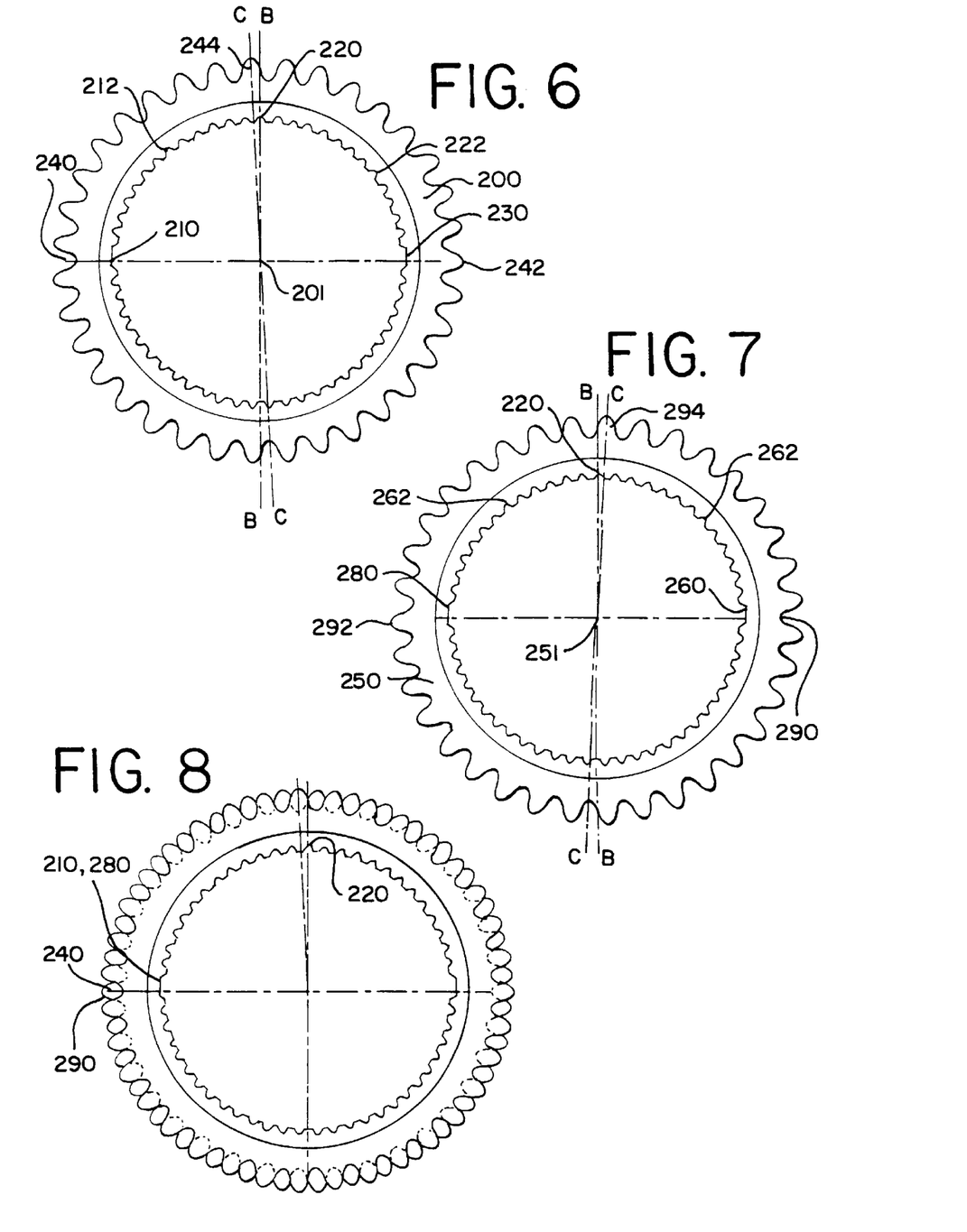
FIG. 6 is a side view of another embodiment of the present invention, with internal splines symmetric about a first axis in the plane of the face of the sprocket and the outer teeth symmetric about a second axis offset from the first axis by one half tooth.
FIG. 7 is a side view of the sprocket shown in FIG. 6, after the sprocket has been rotated about the internal spline axis of symmetry.
FIG. 8 is a side view of two sprockets as shown in FIG. 6 after the sprockets have been assembled in phased relation.

FIGS. 6, 7, and 8 illustrate the sprocket of another embodiment. This embodiment allows one sprocket to be assembled in a phased relationship with a second identical sprocket by rotating the second sprocket about an axis that runs through the center of the sprocket on the face of the sprocket.

Referring to FIG. 6, the internal splines of sprocket 200 are symmetric about an axis BB on the face of the sprocket running from the center of the sprocket 201 through one internal spline tooth 220. Internal splines 210 and 230 are each 90 degrees away from the internal spline axis of symmetry BB.

The outer teeth are also symmetric, but they are symmetric about a different axis of symmetry. The outer teeth are symmetric about an axis CC running along the face of the sprocket 200 from the center 201 through the tip of outer tooth 244. While the axis of symmetry of the internal splines runs through internal spline 220, the axis of symmetry of the outer teeth is offset, running through outer tooth 244.

FIG. 7 shows the same or an identical sprocket as the sprocket shown in FIG. 6, as it would be oriented to be assembled one half outer sprocket tooth out of phase with the sprocket of FIG. 6. The sprocket is rotated 180 degrees about the internal spline axis of symmetry BB which runs through internal spline 220. Referring to FIG. 6, internal spline 210 rotates into the page while internal spline 230 rotates out of the page. After rotation, internal spline 210 occupies the same circumferential position occupied by internal spline 230 before rotation. FIG. 8 is a side view of the sprocket of FIG. 6 and the sprocket of FIG. 7 as they would look assembled onto a central shaft after rotation.

Because the internal splines are symmetric about the axis of rotation, each of the internal splines of the first sprocket is aligned with an internal spline of the second sprocket. For instance, spline 210 is aligned with spline 280, spline 212 is aligned after rotation with spline 262. Therefore, the internal splines of the FIG. 6 sprocket are axially aligned with the internal splines of the FIG. 7 sprocket.

However, the outer sprocket teeth of the FIG. 7 sprocket are offset by one half tooth from the outer sprocket teeth of the FIG. 6 sprocket. Although an internal spline 210 of the first sprocket 200 is aligned axially with an internal spline 280 of the second sprocket 250, the internal spline 210 of the first sprocket 200 is aligned radially with an outer sprocket root 240, whereas the internal spline 280 of the second sprocket 250 is aligned radially with an outer sprocket tip 292.

The offset of the rotated sprocket is a result of the one quarter tooth offset between the axis of symmetry of the internal splines and the axis of symmetry of the outer teeth. For other desired offset, a different offset between the axes would be required. For instance, for one quarter tooth offset, the axis of symmetry of the outer teeth would be offset by one eighth tooth from the axis of symmetry of the internal splines.

FIGS. 9 through 14 show three other embodiments of the invention using symmetric keyway phasing instead of internal splines. These embodiments are directed to sprockets having two keyways on the inner circumferential surface of the sprocket which interlock with projections on the outside surface of the central shaft. A second sprocket, identical to the first, is rotated about a diameter of the sprocket midway between the keyways. The two sprockets will then have keyways aligned and outer sprocket teeth offset.

Figure 9:
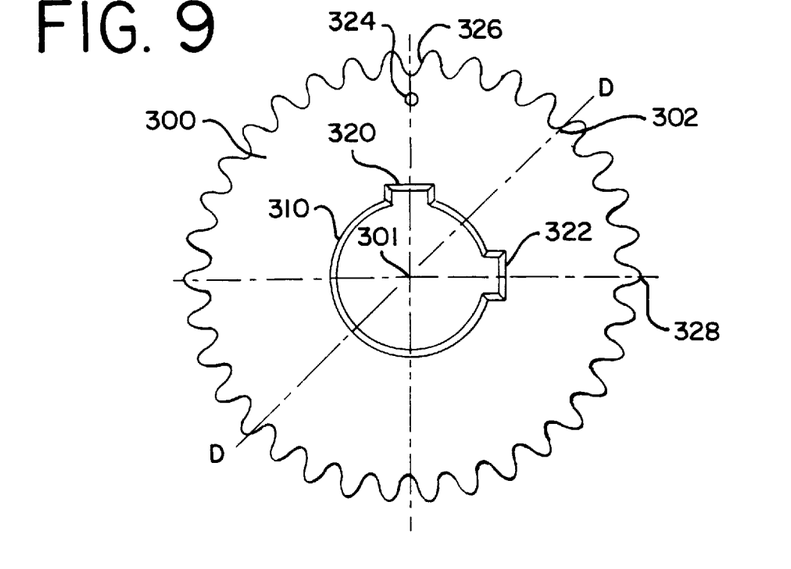
FIG. 9 is a side view of another embodiment having two keyways spaced 90 degrees apart about the axis of the central shaft.

FIG. 9 illustrates a sprocket 300. The inner circumferential surface of the sprocket has two keyways, 320, 322, which are identical in shape and size. One keyway 320 is aligned with an outer tooth root 326 and marked for identification with a hole 324. The other keyway 322 is aligned with an outer tooth tip 328.

Because the keyways are identical in shape and size, an axis DD exists which bisects the sprocket into two symmetrical halves. This axis runs along the face of the sprocket, through the center of the sprocket 301, and through a point 302 midway between the two keyways.

Figure 10:
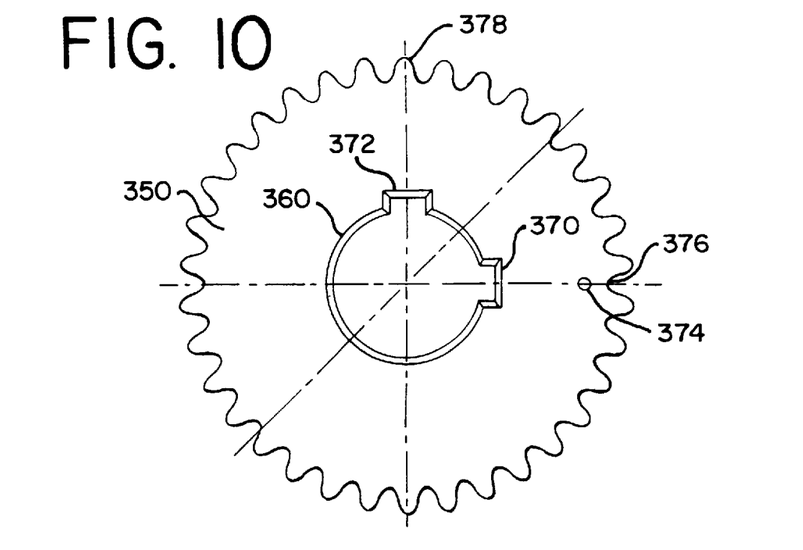
FIG. 10 is a side view of the sprocket shown in FIG. 9, after the sprocket has been rotated about the keyways' axis of symmetry.

FIG. 10 is a side view of the same sprocket shown in FIG. 9 after the sprocket is rotated 180 degrees about this axis of rotation DD. Referring to FIG. 9, the sprocket is rotated about axis DD, so that one keyway 320 rotates into the page and the other keyway 322 rotates out of the page. After rotation, the keyway 320 assumes the circumferential position of the other keyway 322, and the keyway 322 assumes the circumferential position of keyway 320. The keyways 370, 374 of the rotated sprocket 350 are aligned with the keyways 320, 322 of the first sprocket 300.

However, the outer teeth are offset. Although keyway 320 of the FIG. 9 sprocket 300 and keyway 372 of the FIG. 10 sprocket 350 are axially aligned, keyway 320 is radially aligned with an outer sprocket tooth root 326 while keyway 372 is radially aligned with an outer sprocket tooth tip 378. Similarly, while keyway 322 of sprocket 300 is axially aligned with keyway 370 of sprocket 350, keyway 322 is radially aligned with an outer sprocket tooth tip 328 while keyway 370 is radially aligned with an outer sprocket tooth root 376.

Figure 11:
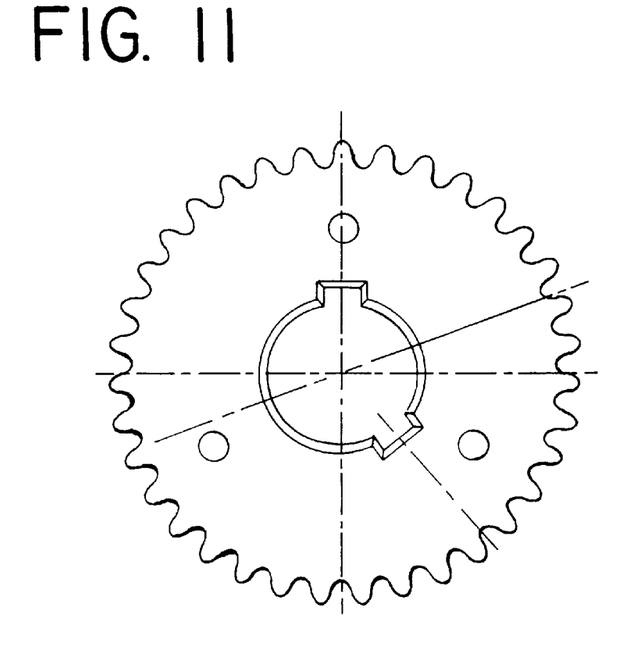
FIG. 11 is a side view of another embodiment having keyways spaced more than 90 degrees apart about the axis of the central shaft.
Figure 12:
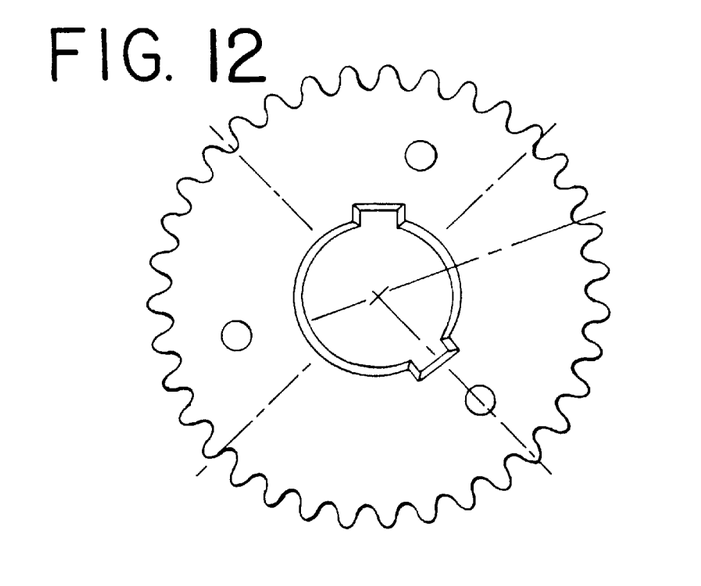
FIG. 12 is a side view of the sprocket shown in FIG. 11, after the sprocket has been rotated about the keyways' axis of symmetry.

FIG. 11 shows another embodiment of the invention. In this embodiment, the sprocket is similar to the sprocket of FIGS. 9 and 10, but the keyways are spaced at an obtuse angle. FIG. 12 shows the sprocket shown in FIG. 11 rotated so that the keyways are aligned, but the outer teeth are offset by one half tooth.

Figure 13:
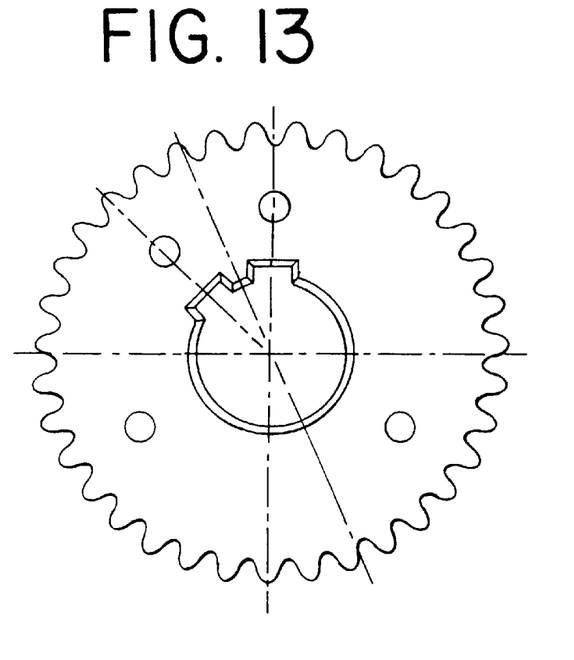
FIG. 13 is a side view of another embodiment having keyways spaced less than 90 degrees apart about the axis of the central shaft.
Figure 14:
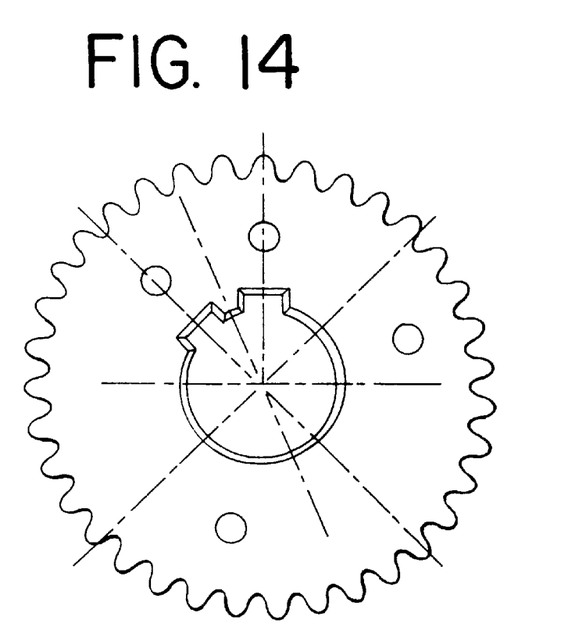
FIG. 14 is a side view of the sprocket shown in FIG. 13, after the sprocket has been rotated about the keyways' axis of symmetry.

FIG. 13 shows another embodiment of the invention. In this embodiment, the sprocket is similar to the sprocket of FIGS. 9 and 10, but the keyways are spaced at an acute angle. FIG. 14 shows the sprocket shown in FIG. 11 rotated so that the keyways are aligned, but the outer teeth are offset by one half tooth.

Figure 15:
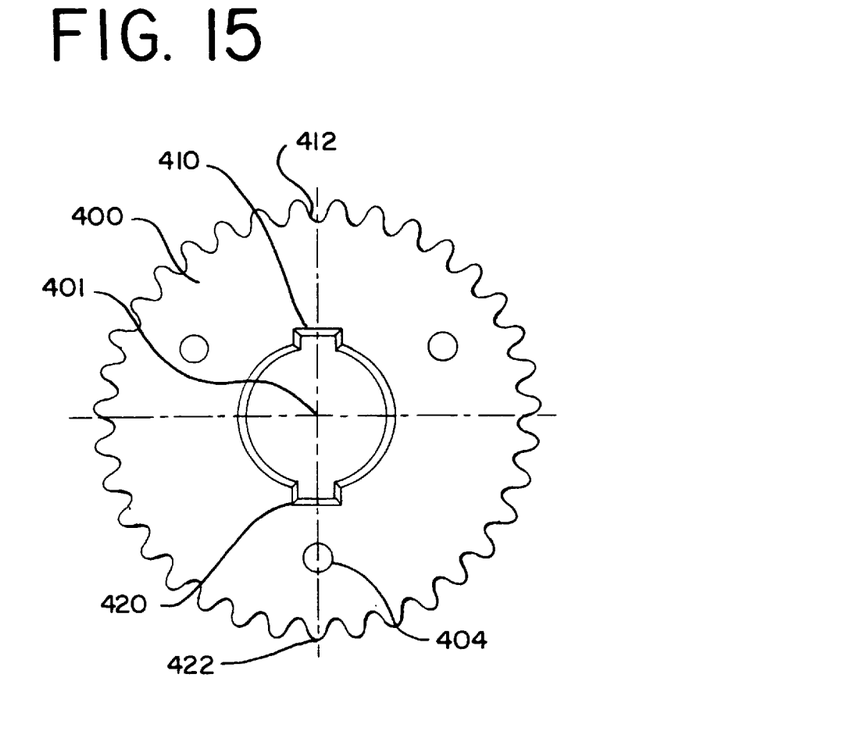
FIG. 15 is a side view of another embodiment having keyways spaced 180 degrees apart about the axis of the central shaft.
Figure 16:
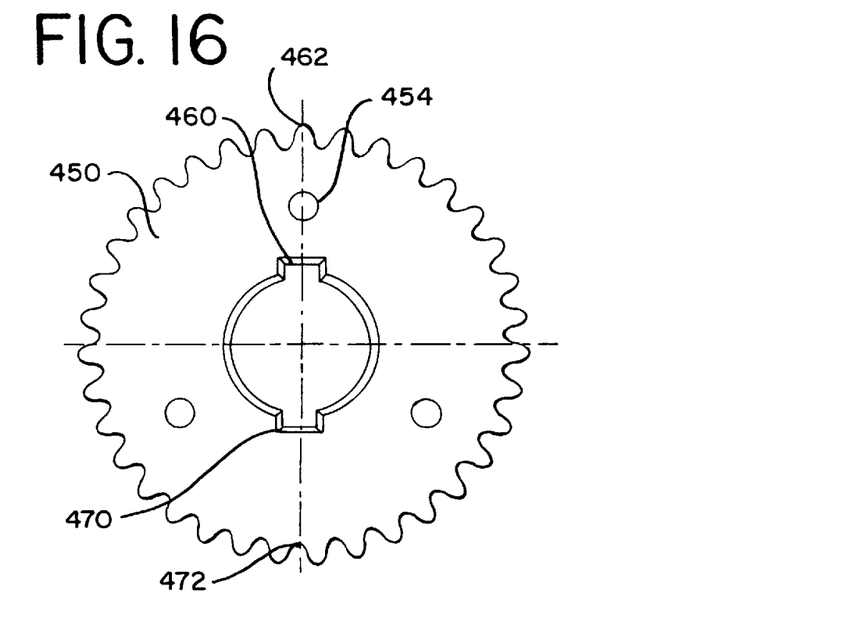
FIG. 16 is a side view of the sprocket shown in FIG. 15 after it has been rotated 180 degrees about the axis of the central shaft.

FIGS. 15 and 16 illustrate another embodiment of the invention. This embodiment is directed toward providing a phased sprocket assembly utilizing two identical sprockets having an odd number of outer teeth and two identical keyways spaced 180 degrees apart. The sprockets are assembled by rotating one sprocket 180 degrees about the axis of the central shaft relative to the other.

FIG. 15 shows a sprocket 400 with two keyways 410, 420 identical in shape and size and spaced 180 degrees apart. One keyway 410 is radially aligned with an outer sprocket tooth root 412 and the other keyway 420 is aligned with an outer sprocket tooth tip 422. One keyway 420 is marked for assembly purposes with a hole 404. The keyways are identical in shape and size.

FIG. 16 shows the sprocket as shown in FIG. 15 oriented as it would be for assembly. The second sprocket 450 is rotated about the axis of the central shaft by 180 degrees with respect to the first sprocket.

The second sprocket 450 has keyways 460, 470 that are axially aligned with the keyways 410, 420 of the first sprocket 400. However, the outer teeth of the second sprocket are offset by one half tooth from the outer teeth of the first sprocket. While keyway 410 of the first sprocket is aligned axially with keyway 460 of the second sprocket, keyway 410 is aligned radially with a sprocket tooth root 412, whereas keyway 460 is aligned radially with a sprocket tooth tip 462. Similarly, keyways 420 and 470 are aligned axially, but the first sprocket keyway 420 is aligned radially with a tooth tip 422 while the second sprocket keyway 470 is aligned radially with a tooth root 472.

The advantages of this embodiment include the ease of manufacture and assembly resulting from requiring only one type of sprocket. In addition, sprockets having keyways may be easier to manufacture than sprockets having splines, and sprockets having keyways spaced 180 degrees apart may be easier to manufacture than sprockets having keyways spaced at another angle. Furthermore, in this embodiment the sprockets are assembled front to back, because the second sprocket is rotated about the axis of the central shaft. This assembly is in contrast to the other keyway embodiments wherein the sprockets are assembled front to front, because the second sprocket is rotated about an axis on the face of the sprocket. This front to back assembly allows the front of the sprocket to have features differing from the features of the back of the sprocket.

Figure 17:
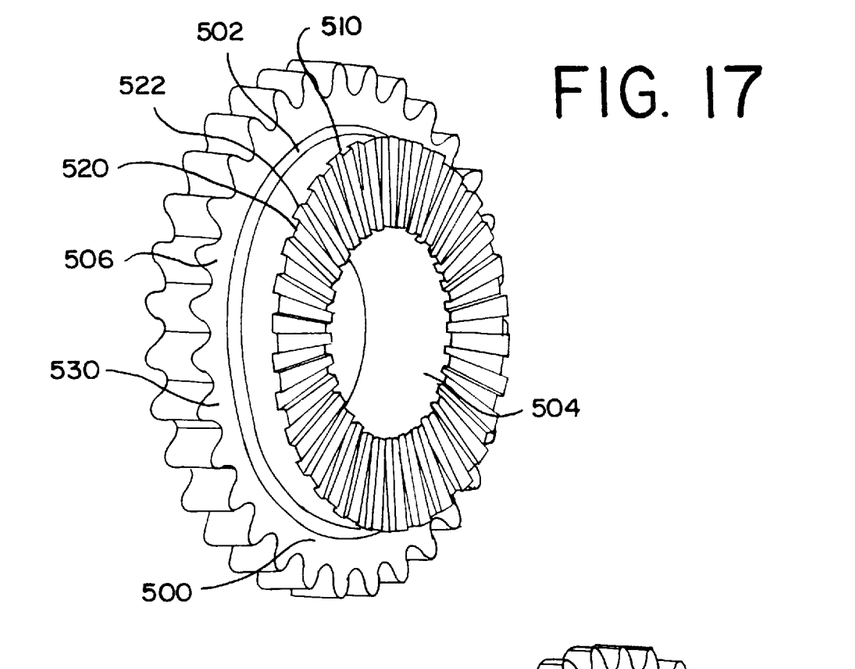
FIG. 17 is a perspective view of another embodiment having square sided splines on the face of the sprocket.

FIG. 17 illustrates another embodiment of the invention. In this embodiment, the sprocket 500 has splines 510 on the face 502 of the sprocket rather than on the inner circumferential surface 504 as in the other embodiments. These facial splines 510 extend radially from the inner circumferential surface toward the outer circumferential surface 506.

In assembly, two sprockets are arranged on the central shaft 30 with facial splines facing each other. One sprocket is rotated by one half of a facial spline, or some multiple of one half spline, so that the tips 520 of the facial splines on one sprocket are axially aligned with the root 522 of the facial splines on the second sprocket. In this way, the facial splines form an interlocking fit between the two sprockets.

The geometry of the sprockets must be such that when one sprocket is assembled offset to an adjacent sprocket by one half of a facial spline tooth, the outer sprocket teeth 530 of the two sprockets are phased. For instance, if one half outer sprocket tooth offset is desired, the number of outer sprocket teeth must be some multiple of the number of facial splines.

Consider a system with the same number of facial splines as outer teeth. If the splines and outer teeth are evenly spaced circumferentially, then the angular width of each outer tooth must be equal to the angular width of each spline. Rotating the sprocket by one half of a facial spline necessarily offsets the outer teeth by one half of an outer tooth. The same is true for any system of sprockets having a number of outer sprocket teeth which is a multiple of the number of facial splines.

This embodiment has advantages in ease of manufacturing and assembly in addition to the advantages resulting from constructing a phased chain and sprocket system out of identical sprockets. In assembly, the rotational position of one sprocket with respect to another sprocket is unimportant, as long as the splines interconnect. Positioning two sprockets face to face with splines interlocking will always result in teeth that are phased.

In addition, this embodiment has advantages resulting from the non-rigid connection between the sprockets and the central shaft. A sprocket of this configuration may be used in an application such as a transfer case where the sprocket is sometimes not rigidly connected to the central shaft but is allowed to spin under some conditions. A clutch pack or dogleg on the side of the sprocket would supply the means to transmit torque.

Figure 18:
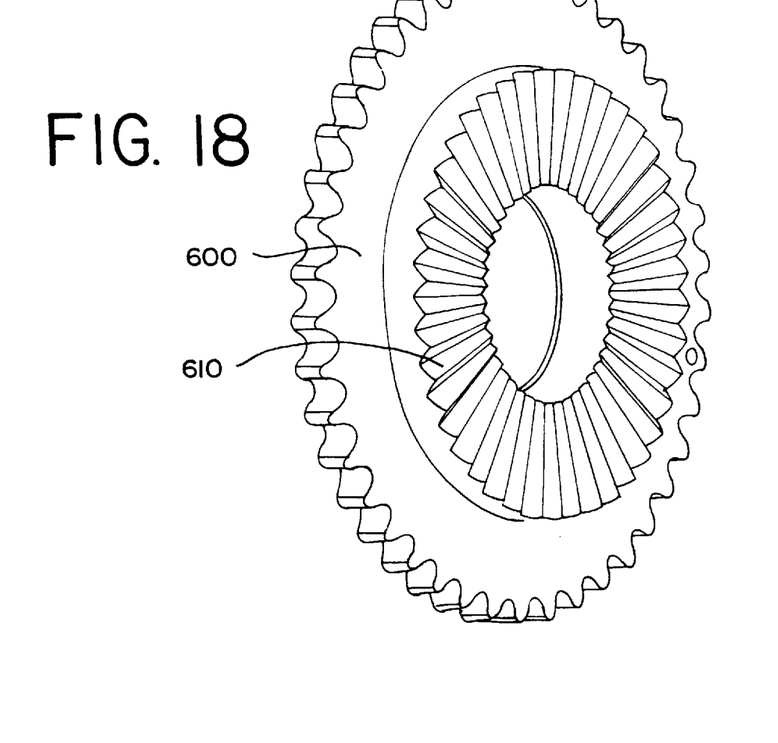
FIG. 18 is a perspective of another embodiment having straight sided splines on the face of the sprocket.

FIG. 18 shows another embodiment of the invention. This embodiment is directed to a sprocket 600 having facial splines, as in the embodiment shown in FIG. 17. However, the facial splines in the FIG. 17 sprocket are square sided splines, while the facial splines 610 in the FIG. 18 embodiment are straight sided splines.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

Other embodiments may include additional features in conjunction with the present system, yet be within the scope of the present invention. For example, one sprocket may include a clutch cone or other feature on its face which is not present on the other sprocket.

What is claimed is:

1. A phased chain and sprocket system, comprising:
   a central shaft, said shaft having an outer circumferential surface, and a plurality of splined teeth on said outer circumferential surface;
   a plurality of sprockets including a first sprocket and a second sprocket, said first and said second sprockets being substantially identical in construction and form;
   each of said sprockets having a circular inner circumferential surface and a circular outer circumferential surface formed concentrically around a centerpoint, each said sprocket having a pair of faces, one of said faces being located on a first side of said sprocket and the other of said faces being located on the other side of said sprocket, each said face being defined as the surface of the sprocket located between said inner circumferential surface and said outer circumferential surface;
   said outer circumferential surface of each said sprocket having at least 30 outwardly extending outer sprocket teeth provided thereon, and a corresponding number of lands located between said outer sprocket teeth;
   each of said sprockets having a first axis and a second axis along each said face, each said first axis extending along said face and passing through the center of one of said outer sprocket teeth and the center of said face of said sprocket, each said second axis extending along said face and passing through the center of one of said outer sprocket lands and the center of said face of said sprocket, said first axis on said first face being aligned with said first axis on said second face on each said sprocket, said second axis on said first face being aligned with said second axis on said second face of each said sprocket,
   a plurality of inner splines located on said inner circumferential surface, said inner splines being located such that said first axis of said first sprocket is aligned with said second axis of said second sprocket when said first and said second sprockets are mounted on said central shaft,
   said outer sprocket teeth of said first sprocket being offset by one half pitch from said outer teeth of said second sprocket when said sprockets are mounted on said central shaft; and
   a plurality of phased chains having links with inverted teeth adapted to provide transmission of power with said outer sprocket teeth of said plurality of sprockets.

2. The phased chain and sprocket system of claim 1, wherein each said first axis is offset by 45° from each said second axis along each said face of each said sprocket.

3. The phased chain and sprocket system of claim 1, wherein each said first axis is offset by 90° from each said second axis along each said face of each said sprocket.

4. The phased chain and sprocket system of claim 1, wherein each said first axis is offset by 120° from each said second axis along each said face of each said sprocket.

5. The phased chain and sprocket system of claim 1, wherein each said first axis is offset by 180° from each said second axis along each said face of each said sprocket.

6. The phased chain and sprocket system of claim 1, wherein said splines include a first spline and a second spline, said first spline being aligned with said first axis and said second spline being aligned with said second axis on each of said sprockets.

7. The phased chain and sprocket system of claim 1, wherein said splines further comprise a third spline and a fourth spline, said third spline being aligned with said first axis and said fourth spline being aligned with said second axis on each of said sprockets.

8. The phased chain and sprocket system of claim 1, wherein said inner splines are a pair of keyways located on each sprocket.

9. The phased chain and sprocket system of claim 8, wherein said keyways include a first keyway and a second keyway, said first keyway being aligned with said first axis and said second keyway being aligned with said second axis on each of said sprockets.

10. The phased chain and sprocket system of claim 8, wherein said keyways further comprise a third keyway and a fourth keyway, said third keyway being aligned with said first axis and said forth keyway being aligned with said second axis on each of said sprockets.

11. A method of manufacture of a phased chain and sprocket system, said system including a central shaft having an outer surface and a plurality of keys on said outside surface, a plurality of identical sprockets positioned on the central shaft, and a plurality of phased chains having links with inverted teeth adapted for engagement with the teeth of the sprockets, each of said sprockets having at least 30 outer sprocket teeth and a plurality of keyways engaging said keys on said central shaft, each said sprocket having a face, said face being defined as the surface of the sprocket located between said sprocket teeth and said keyways, each said face having a first axis and a second axis, each said axis extending along said face and passing through the center of said face of said sprocket, comprising the steps of:
   assembling a first said sprocket onto said central shaft such that said shaft keys are aligned and engaged with said keyways;
   rotating a second sprocket with respect to said first sprocket such that said keyways of said second sprocket are engaged with said keys, so that said outer sprocket teeth of said second sprocket are circumferentially offset with respect to said outer sprocket teeth of said first sprocket by a given angular offset, and said first axis of said first sprocket is aligned with said second axis of said second sprocket.

* * * * *